(12) United States Patent
Garcia et al.

(10) Patent No.: US 8,078,217 B2
(45) Date of Patent: Dec. 13, 2011

(54) MODULAR MULTI-SIDED RADIO ARCHITECTURE

(75) Inventors: Jorge L. Garcia, Plantation, FL (US);
Eric D. Brooks, Coral Springs, FL (US);
Scott H. Richards, Plantation, FL (US);
Steven E. Young, Parkland, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1041 days.

(21) Appl. No.: 11/694,810

(22) Filed: Mar. 30, 2007

(65) Prior Publication Data

US 2008/0242375 A1  Oct. 2, 2008

(51) Int. Cl.
*H04M 1/00* (2006.01)

(52) U.S. Cl. ............ 455/550.1; 455/575.1; 455/90.3; 379/433.02; 379/433.11

(58) Field of Classification Search ............ 455/425, 455/424, 456.5, 456.6, 561, 550.1, 575.1, 455/90.3, 569.1, 90.1, 347, 575.6, 90.2, 349; 379/433.1, 433.02, 431, 428.01, 433.11, 379/433.01
See application file for complete search history.

(56) References Cited

U.S. PATENT DOCUMENTS

| | | | | |
|---|---|---|---|---|
| 2,963,577 | A * | 12/1960 | Errichiello et al. | 455/349 |
| 3,102,248 | A * | 8/1963 | Temple | 338/274 |
| 4,131,851 | A * | 12/1978 | Martiny et al. | 381/2 |
| 4,286,335 | A * | 8/1981 | Eichler et al. | 455/90.3 |
| 4,578,739 | A * | 3/1986 | McKee et al. | 361/740 |
| 4,681,548 | A * | 7/1987 | Lemelson | 434/311 |
| 5,832,388 | A | 11/1998 | Williams et al. | |
| 5,991,644 | A * | 11/1999 | Ogawa | 455/566 |
| 6,073,027 | A * | 6/2000 | Norman et al. | 455/575.4 |
| 6,118,380 | A * | 9/2000 | Gannon | 340/573.4 |
| 6,390,845 | B1 * | 5/2002 | Brady | 439/372 |
| 6,394,225 | B1 * | 5/2002 | Yasuda | 181/256 |
| 6,434,407 | B1 * | 8/2002 | Cook | 455/569.1 |
| 6,708,021 | B1 * | 3/2004 | Shim et al. | 455/90.1 |
| 6,876,543 | B2 * | 4/2005 | Mockridge et al. | 455/347 |

(Continued)

FOREIGN PATENT DOCUMENTS

EP  0731568 A2  9/1996

(Continued)

OTHER PUBLICATIONS

PCT International Search Report Dated Nov. 5, 2008 for Applicaiton No. PCT/US2008/056614—14 Pages.

(Continued)

*Primary Examiner* — Duc Nguyen
*Assistant Examiner* — Charles Chow
(74) *Attorney, Agent, or Firm* — Barbara R. Doutre

(57) ABSTRACT

A multi-sided radio (200) includes an audio centric side (210) including a speaker (208) operationally independent of functions on an opposing side, a data centric side (220) on the opposing side of the audio centric side, and a top controller side (250) having at least one control function (202 or 204). The audio centric side can include an option module (242) for placement as an insert enabling additional functions including camera functions, environmental sensors, WLAN transceivers, audio upgrades, and bar code readers as examples. The data centric side can include a keypad (214 and 216) and a display (218). The speaker can reside behind the display of the data centric side and has full porting out of the audio centric side.

21 Claims, 5 Drawing Sheets

U.S. PATENT DOCUMENTS

| | | | |
|---|---|---|---|
| 7,043,283 B2 * | 5/2006 | Domes | 455/575.1 |
| 7,058,433 B2 * | 6/2006 | Carpenter | 455/575.1 |
| 7,092,745 B1 * | 8/2006 | D'Souza | 455/575.1 |
| 7,190,312 B2 * | 3/2007 | Holmes et al. | 343/702 |
| 7,239,700 B2 * | 7/2007 | Fuhrmann et al. | 379/433.11 |
| 7,416,084 B2 * | 8/2008 | Tse | 209/294 |
| 7,565,178 B1 * | 7/2009 | Sitachitt et al. | 455/569.1 |
| 7,565,184 B2 * | 7/2009 | Lee et al. | 455/575.1 |
| 7,633,449 B2 * | 12/2009 | Oh et al. | 343/702 |
| 7,640,041 B2 * | 12/2009 | Ragan | 455/572 |
| 2004/0091101 A1 * | 5/2004 | Park et al. | 379/428.01 |
| 2006/0054704 A1 * | 3/2006 | Fitch et al. | 235/472.01 |
| 2007/0142072 A1 * | 6/2007 | Lassally | 455/518 |
| 2007/0146330 A1 * | 6/2007 | Nguyen et al. | 345/169 |
| 2007/0191070 A1 * | 8/2007 | Rao | 455/566 |
| 2008/0198061 A1 * | 8/2008 | Chen et al. | 342/20 |

FOREIGN PATENT DOCUMENTS

| | | |
|---|---|---|
| EP | WO2004008724 A1 | 1/2004 |
| WO | 2004008724 A1 | 1/2004 |

OTHER PUBLICATIONS

PCT/U2008/056614—International Search Report with Written Opinion mailed May 11, 2008—14 pages.
Australian Application No. 2008232973—First Rejection dated Jun. 9, 2010—2 pages.
Russian Application No. 2009140036/07(056854)—Translation Rejection dated Feb. 8, 2010—2 pages.

\* cited by examiner

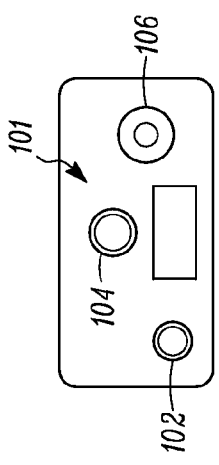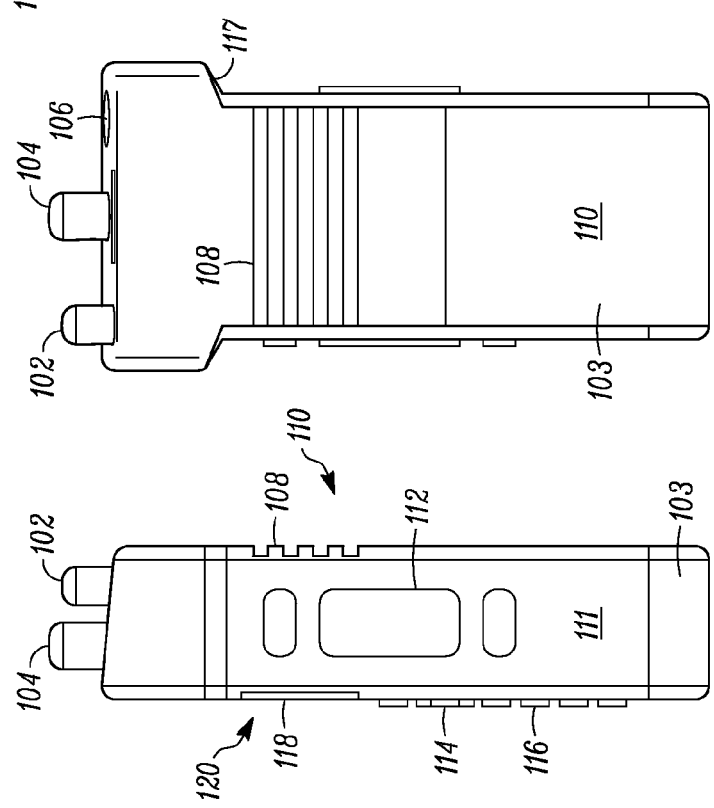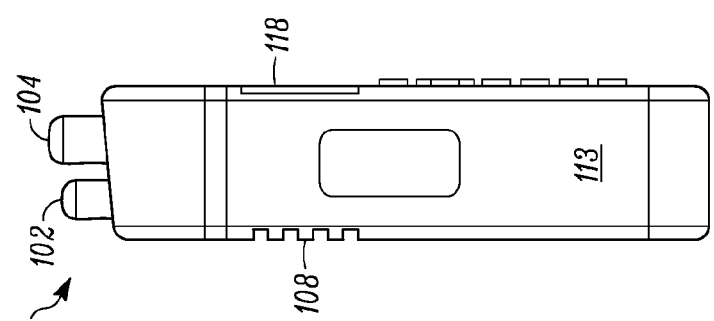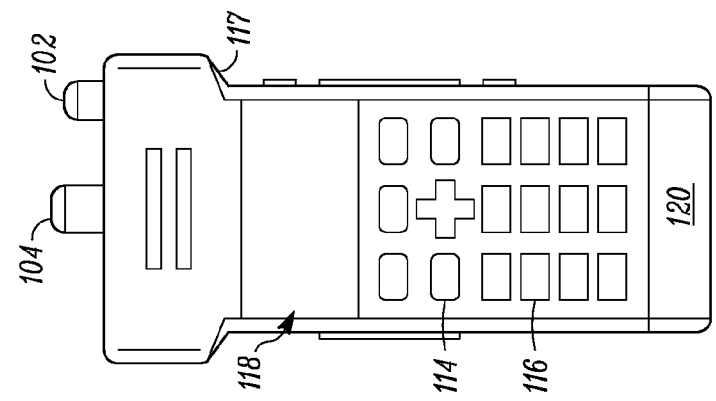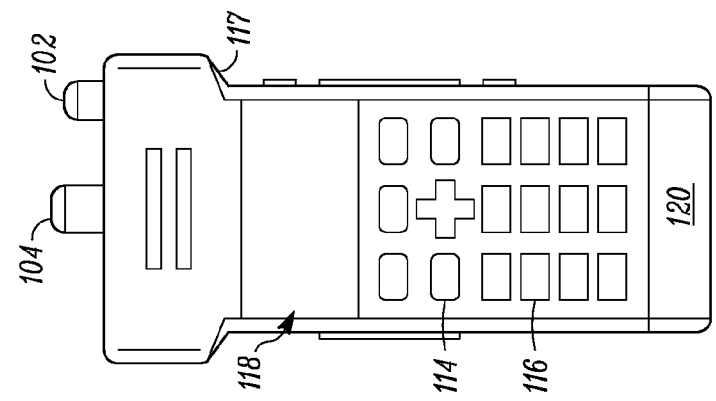

MODULAR MULTI-SIDED RADIO ARCHITECTURE

FIELD

This invention relates generally to modular radios, and more particularly to modular multi-sided radios.

BACKGROUND

There are various dual sided radio designs, but existing designs have generally failed to adequately balance the need to provide controls and user interface elements on a single side of the radio with appropriate requirements in terms of the size and usability of keypads, displays, and speaker porting for a particular design. Appropriate sizing of keypads, displays and speaker ports are often in conflict with the general trend towards miniaturization and a drive towards minimizing radio sizes and volumetric efficiency. Furthermore, the geometry of a one-sided design will often limit the ability to arrange internal components in a manner that can be efficient for modularity. In the context of two-way radios or cellular phones, modularity can mean provisioning of alternative or optional functional components within a particular radio design. Modularity can enhance customization for users having specific requirements and also enables other users as well as manufacturers to save costs by eliminating components or modules that are not going to be used. Providing modularity under current size constraints and other functional constraints has generally forced many manufacturers to compromise significantly in terms of design functionality, particularly with respect to keypads, displays, and speaker porting.

Most radio designs are "keypad/display dominant" in form factor where the side most naturally oriented toward the user during push-to-talk (PTT) or transmit operations is the keypad/display side. When the user faces the keypad/display a PTT button is on the left and a loudspeaker is on the "rear" of the product. As dual or multi-sided radios are required to provide increased functionality to both sides of the radio, the need arises for an optimized user interface.

Accordingly, there is a need to provide a multi-sided radio having a user-friendly interface with modular capability, while addressing the challenges ease of assembly and manufacturability.

SUMMARY

Embodiments in accordance with the present invention can provide a modular multi-sided radio that enables a volumetrically efficient placement of components in a design that does not necessarily compromise functionality and sizing in terms of speaker porting and keypad and display placement.

In a first embodiment of the present invention, a multi-sided radio can include an audio centric side including a speaker independent of a remaining portion of the multi-sided radio, a modularly variable side opposing the audio centric side, and a top controller side having at least one control function, wherein the at least one control function controls functions on at least one among the audio centric side and the modularly variable side when the modularly variable side includes at least one electronic function. The audio centric side can include an option module for placement as a speaker grill insert enabling additional functions among camera functions, environmental sensors, WLAN transceivers, Bluetooth modules, audio upgrades, bar code readers, and infrared decoders. The modularly variable side can include a keypad and a display where the speaker optionally resides behind the display of the modularly variable side and has full porting out of the audio centric side. Optionally or alternatively, the modularly variable side can include a housing having a belt clip attachment feature. In other aspects, a housing for the multi-sided radio can include an ergonomical flare out feature that is substantially symmetrical on opposing sides. A battery pack housing can also serve as an external portion of a housing used for the audio centric side.

In a second embodiment of the present invention, a multi-sided radio can include an audio centric side including a speaker operationally independent of functions offered on an opposing side of the audio centric side of the multi-sided radio, a data centric side on the opposing side of the audio centric side, and a top controller side having at least one control function where at least one control function controls functions on at least one among the audio centric side and the data centric side. The audio centric side can include an option module for placement as a speaker grill insert enabling additional functions among camera functions, environmental sensors, WLAN transceivers, Bluetooth modules, audio upgrades, bar code readers, and infrared decoders. The data centric side can include a keypad and a display. The speaker can reside behind the display of the data centric side and has full porting out of the audio centric side. The top controller side can further include a top side display that is slanted towards the audio centric side. Note, a housing design used for the data centric side and the audio centric side is substantially symmetrical. The data centric can further include a speaker that operates independent of the speaker on the audio centric side. In a third embodiment of the present invention, a multi-sided radio can include an audio centric side including a speaker, a modularly variable data centric side opposing the audio centric side, and a top controller side having at least one control function where at least one control function controls functions on the audio centric side and controls functions on the modularly variable data centric side when the modularly variable side includes at least one electronic function. The speaker of the audio centric side can be operationally or mechanically independent of the modularly variable data centric side and the top controller side further includes a display.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. A speaker being "independent" of a remaining portion of the multi-sided radio can generally mean that the speaker is electrically, mechanically, and acoustically independent of any other speaker used in the radio.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. A "processor" can be any suitable component or combination of components, including any suitable hardware or software, that are capable of executing the processes described in relation to the inventive arrangements.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 1 is left side view of a multi-sided radio in accordance with an embodiment of the present invention.

FIG. 2 is front plan view of the multi-sided radio of FIG. 1 in accordance with an embodiment of the present invention.

FIG. 3 is right side view of the multi-sided radio of FIG. 1 in accordance with an embodiment of the present invention.

FIG. 4 is rear plan view of the multi-sided radio of FIG. 1 in accordance with an embodiment of the present invention.

FIG. 5 is a top view of the multi-sided radio of FIG. 1 in accordance with an embodiment of the present invention.

DETAILED DESCRIPTION OF THE DRAWINGS

Figure 6:
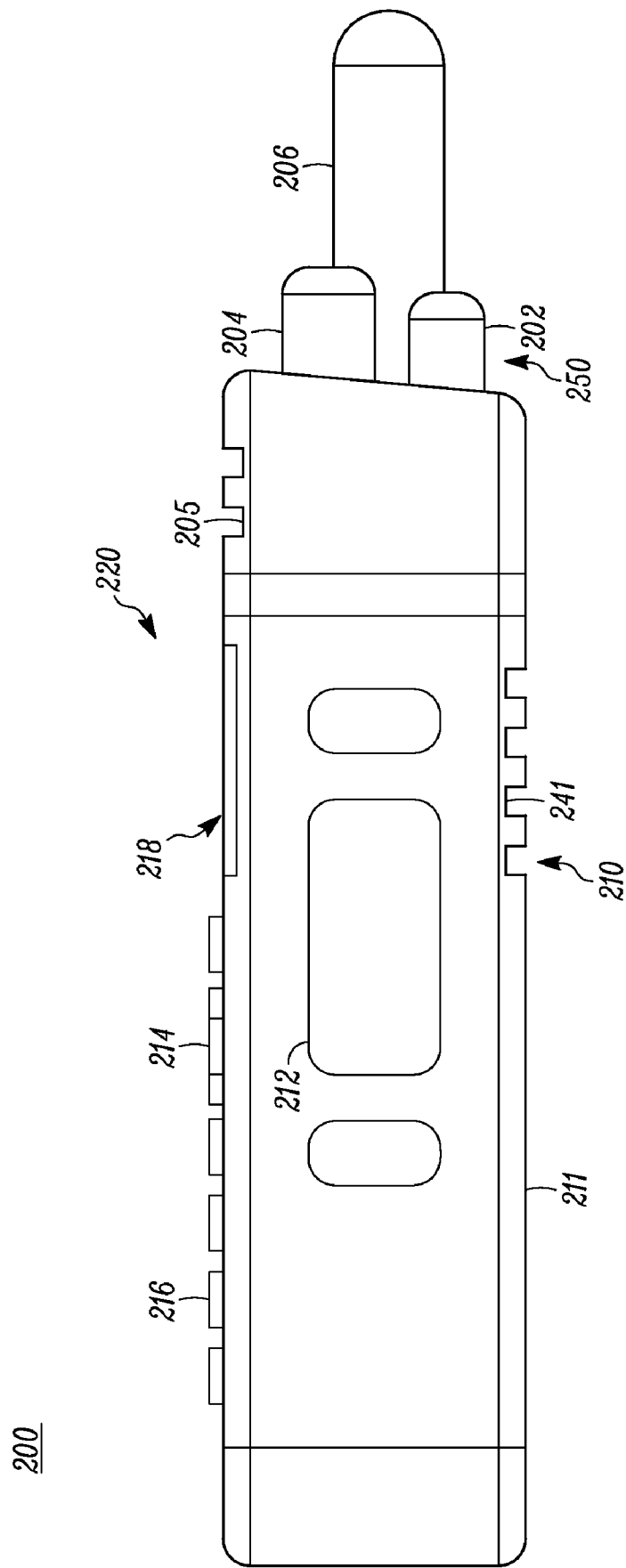
FIG. 6 is a side view of a multi-sided radio in accordance with another embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways in various devices such as in two-way radios or cellular phones having a multi-sided architecture. Such architecture can enable thin or minimal volumetric designs that do not compromise functionality and sizing for many of the components of the device. The architecture can further enable modular options or alternatives that still do not compromise functionality and sizing. In one particular embodiment, a dual sided radio 100 as shown in FIGS. 1-5 allows for a small architecture or even the smallest possible architecture by taking advantage of the surface area of both sides for maximum speaker, keypad, and display areas. No previous design offers the level of modularity that is offered by this architecture as will become apparent with the further description of the figures.

Referring to FIGS. 1-5, the multi-sided or dual sided radio 100 can include an audio centric or modularly variable side 110 and a data centric side 120. In particular, FIG. 1 illustrates a left side 111, FIG. 2 illustrates a front side, FIG. 3 illustrates a right side 113, FIG. 4 illustrates a rear view, and FIG. 5 illustrates a top view of the radio 100.

Figure 7:
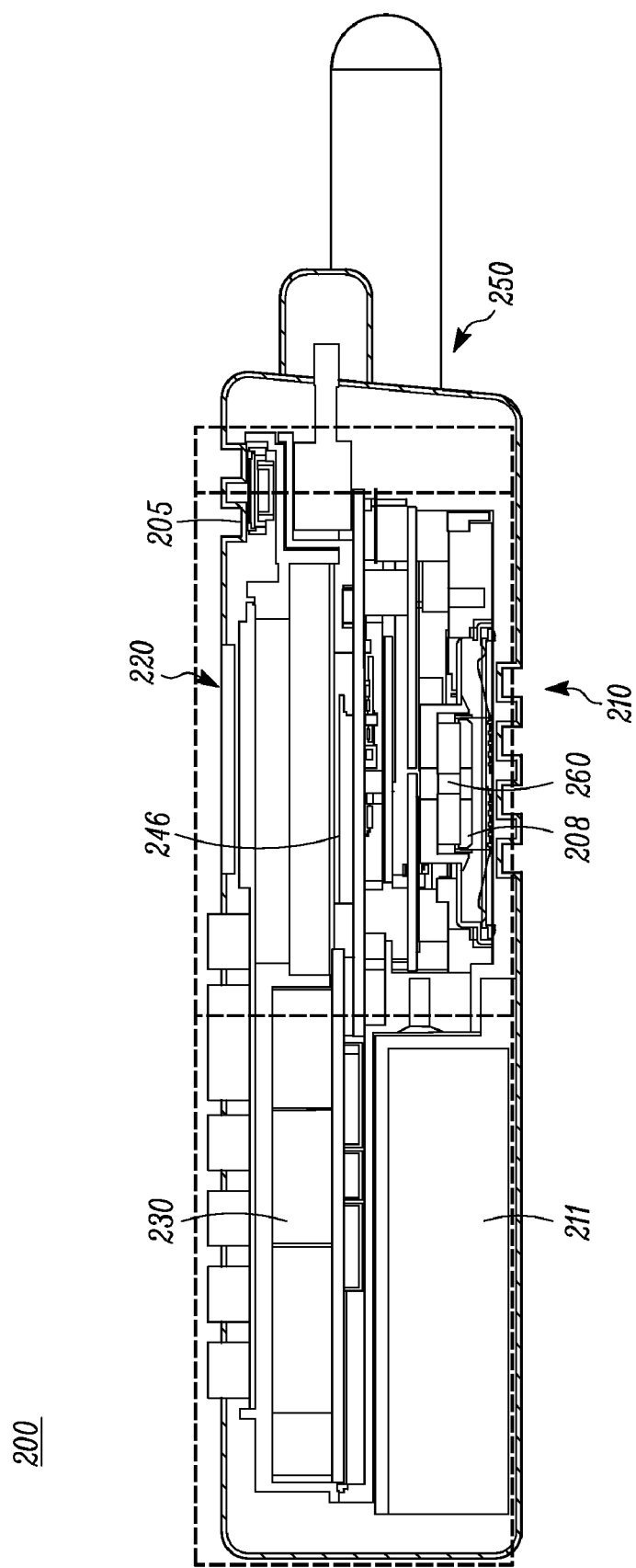
FIG. 7 is an internal side view of the multi-sided radio of FIG. 6 in accordance with an embodiment of the present invention.
Figure 8:
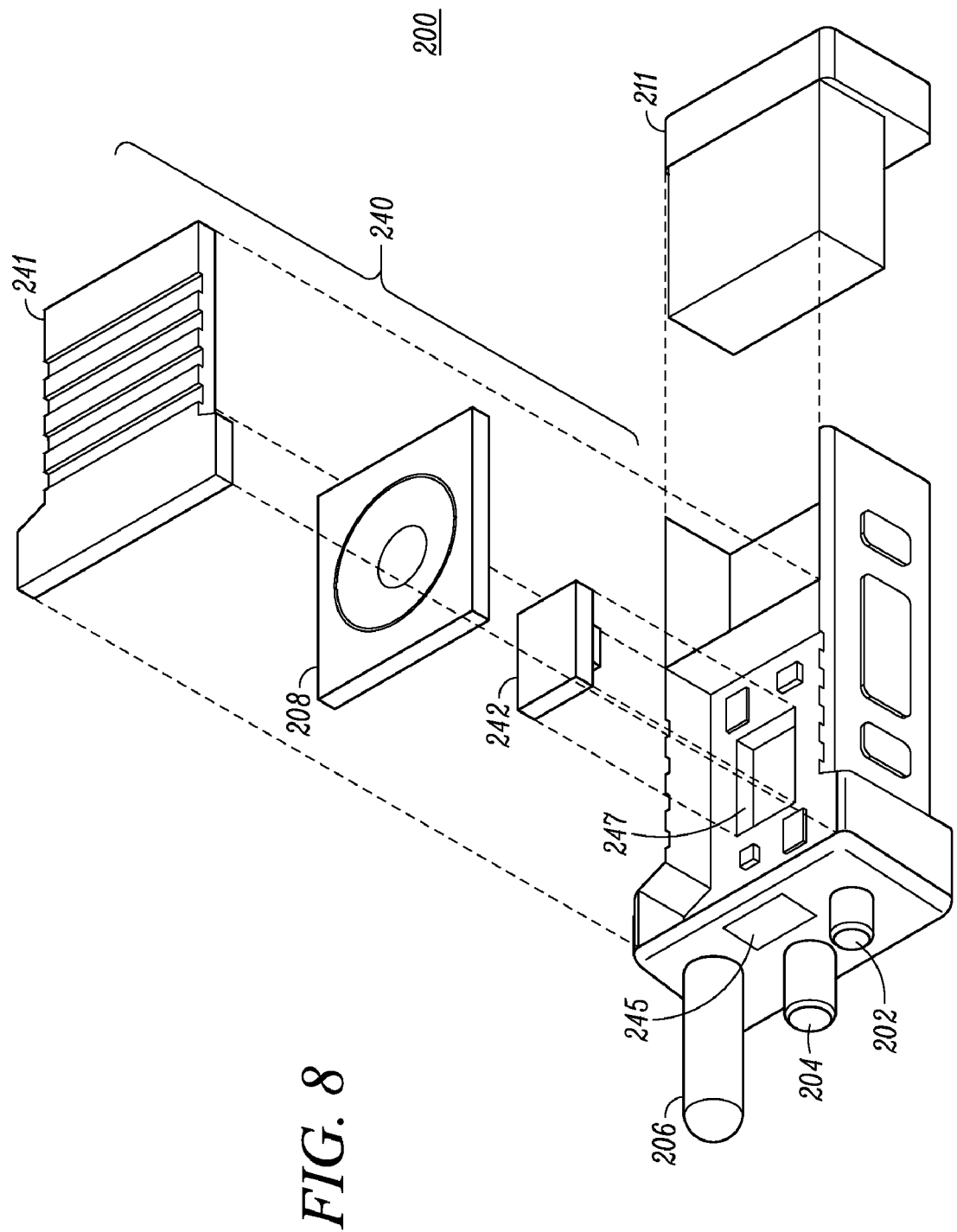
FIG. 8 is an exploded view of an audio centric side of the multi-sided radio of FIG. 6 in accordance with an embodiment of the present invention.

With reference to FIGS. 1 and 2, the front or audio centric or modularly variable side 110 can include a speaker grill 108 having a fully ported speaker (not shown) residing behind the grill 108. The front side 110 is modular since the grill 108 and speaker can be removed temporarily to enable the placement (or replacement) of additional components behind or alongside the speaker. Internal views of an embodiment of the radio as illustrated in FIGS. 7 and 8 will make this more apparent. The front side 110 can further include a battery pack 103 that serves as part of the overall housing for the radio 100. As can be seen from the front view of FIG. 2 as well most other views, a top control area 101 can include various controls such as rotary control knobs 102 and 104. In this particular design, the top control area 101 can further include an antenna port 106 for mating with an antenna (not shown). The control knobs can be for volume and channel selection for example and can provide functionality for either the audio centric side or the modularly variable side or both. Note, the top control can include a scheme of channel changing (affecting the function of the whole radio) and volume control (which may or may not affect the audio centric side. In one particular arrangement, the speaker on the audio centric side can be turned off by software controls so that another speaker can be made active. The other speaker can either be a speaker on the modularly variable side or an external speaker attached to a radio's accessory connector such as a remote speaker/microphone (RSM), such as used by law enforcement.

Figure 11:
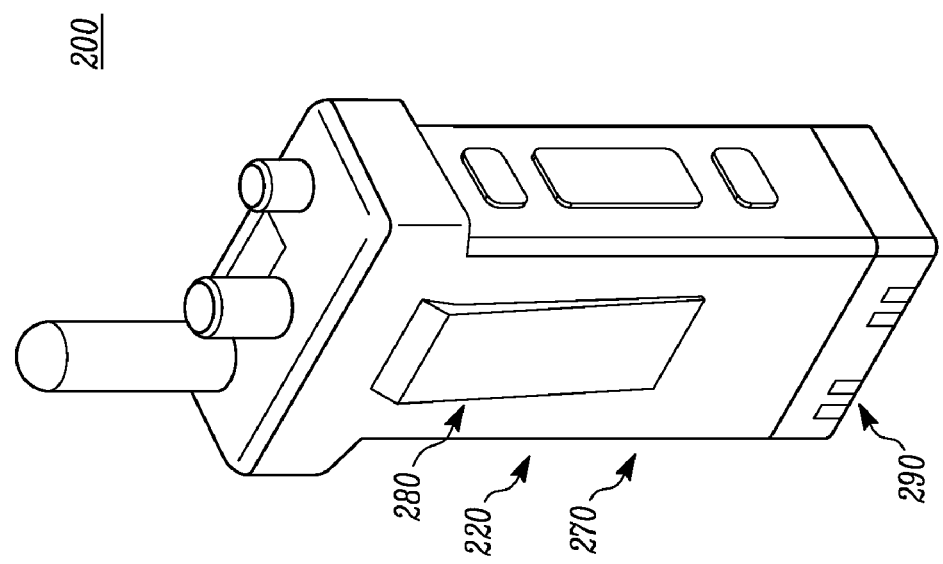
FIG. 11 is a rear perspective view of an alternative embodiment of the radio of FIG. 6 in accordance with an embodiment of the present invention.

The data centric side 120 as best explained with respect to FIGS. 1 and 4 can include a display 118 and a keypad. The keypad can include navigation keys 114 and alphanumeric or numeric keys 116. The data centric side 120 can also be thought of as being modular to the extent that the display and/or keypad can be removed in a limited version (see FIGS. 10 and 11). The limited version can replace the keypad and display with a housing suited for receiving a belt clip attachment feature for example as shown in FIG. 11. The limited version can be the same radio with a housing that replaces the display and keypad features with the belt clip attachment feature.

The radio 100 can also include a push-to-talk actuator or button 112 to enable walk-talkie style communications either directly with other radios or via a network of one or more base stations. The radio 100 viewed from the front or back is generally or substantially symmetric. More particularly, the housing for the front and back sides are substantially symmetric. The housing can include flaring grip features 117 that allows for a better ergonomic grip and also creates a widened control top interface area 101. As noted above, the radio 100 can be designed with an audio centric side 110 (the speaker side) and a data centric side 120 (the keypad/display side). The data centric 120 can also include a speaker as well as shown by item 205 in the embodiment of FIG. 6. The control top 101 can be angled, tilted or inclined toward the audio centric side 110 as best illustrated by FIGS. 1-3 and can include a top mounted LCD as shown in the embodiment of FIG. 8.

Referring to FIGS. 6-11, another multi-sided radio 200 is shown similar to the radio 100 of FIGS. 1-5. The radio 200 similarly includes an audio centric side 210 and a data centric side 220. Note, in this embodiment, the audio centric side 210 or the data centric side 220 can both be considered modularly variable sides.

Referring again to FIGS. 6-8, the radio 200 can include an audio centric side 210 having a speaker grill 241 and a speaker 208 and a data centric side 220 having a display 218 and a keypad having navigational keys 214 and alphanumeric or numeric keys 216. The data centric side 220 can optionally include a speaker 205 that operates independently from the speaker 208. In other words, speaker 205 on the data centric side and speaker 208 on the audio centric side can operate independently of each other and are otherwise electrically, mechanically, and acoustically independent of each other.

The radio 200 can further include a push-to-talk activation button 212 as well as a control top area 250 having controls 202 and 204. The control top area 250 can further receive an antenna 206 for embodiments utilizing an external antenna as shown. As in the embodiment of FIGS. 1-5, the top control area 250 can be angled, tilted or inclined toward the audio centric side 210 as shown.

In this particular embodiment, the radio 200 can be essentially segmented into five general areas as shown in FIG. 7. The data centric side 220 can include a keypad and radio frequency (RF) board area 230 as well as a display and vocoder board area 246. The area 246 can optionally include the speaker 205. The audio centric side 210 can include the speaker and option module area 260 which can include the speaker 208 as well as an option module or modules that can perform various different functions as customized by a user or manufacturer. Below the audio centric side 210 can be the battery pack 211. The last general area is the top control area 250 which can include a display 245 as seen in FIG. 8.

Referring to FIG. 8, an exploded view of the radio 200 is shown with emphasis on the audio centric side 210 and the modular aspects further revealed via modular variable assembly 240. Note, modularity can be optimized by making the speaker or audio centric side 210 an independent part from the rest of the radio housing which enables a multitude of different options including camera, environmental sensors, readers, or other components to be integrated into the radio with option specific grill inserts. Thus, the speaker grill 241 and speaker 208 can be temporarily removed to allow the insertion or removal of an option module 242 within a cavity area 247. As noted above, the option module 242 can provide camera functions, environmental sensors, WLAN transceivers, Bluetooth modules, audio upgrades, bar code readers, and infrared decoders among any number of other functions as desired. Further note, the battery pack 211 serves as part of the external housing for the radio 200.

The architecture or design embodiments illustrated in FIGS. 1-11 enables external surfaces of the radio to be used more efficiently to support and improve the physical user interface. The design also enables components which typically compete for space on a single sided product to be mounted on opposite sides for more optimum packaging. For example, instead of reducing the amount of speaker porting or the size of the display or keypads, the speaker is able to reside behind the display and enjoy full porting in the opposite direction. The radio can also be made very thin because the speaker 208 and battery 211 are not necessarily in a z-directional stack-up as found in many existing designs.

Figure 10:
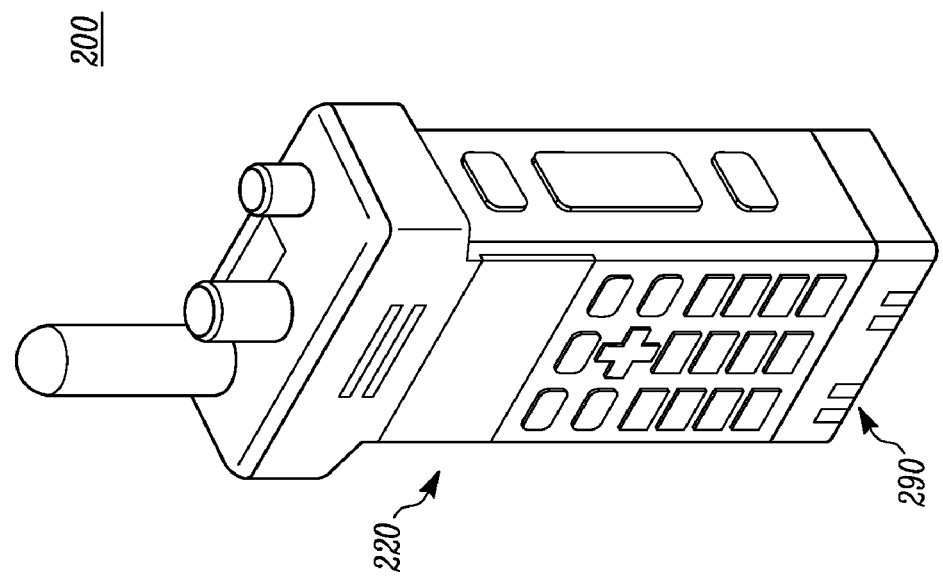
FIG. 10 is a rear perspective view of the multi-sided radio of FIG. 6 in accordance with an embodiment of the present invention.
Figure 9:
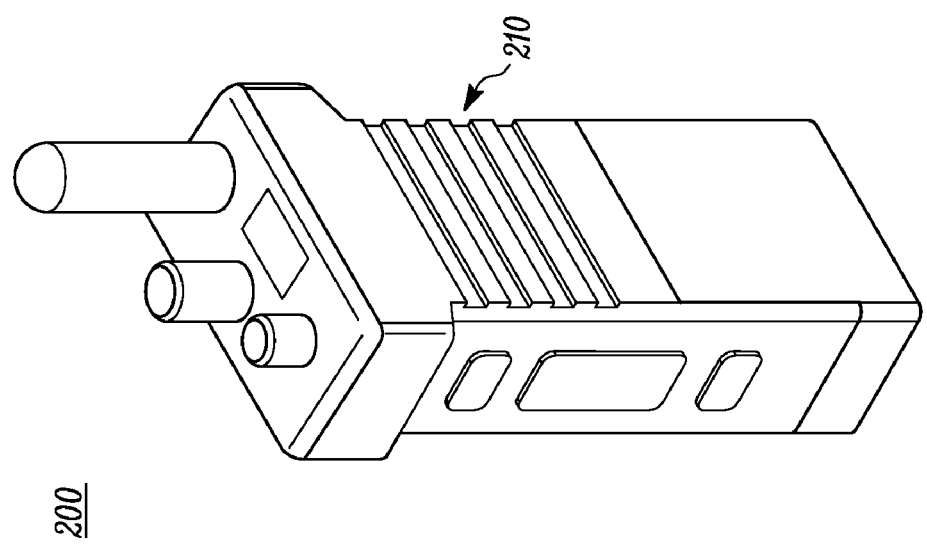
FIG. 9 is a front perspective view of the multi-sided radio of FIG. 6 in accordance with an embodiment of the present invention.

Referring to FIGS. 9-11, perspective views of the radio 200 in alternative embodiments are shown. In FIG. 9, the audio centric side 210 is shown and in FIG. 10 the data centric side 220 is shown. The data centric side 220 can further include battery charging contacts and/or data contacts 290. As previously noted, the data centric side 220 can also be thought of as being modular to the extent that the display and/or keypad can be removed in a limited version as shown in FIG. 11. The limited version can replace the keypad and display with a housing 270 suited for receiving a belt clip attachment feature 280. The limited version can be the same radio as shown in FIGS. 9 and 10 with a housing 270 that replaces the display and keypad features with the belt clip attachment feature.

Accordingly there has been provided a multi-sided radio providing a "loudspeaker dominant" form factor in which a "front" loudspeaker faces the user and the PTT button is to the left while the keypad/display is located on an opposite side. A dual-sided radio, such as radio 100 or 200, formed in accordance with the present invention, whether equipped with a display or not, provides a speaker 208 consistently positioned in a front, central, and dominant location 110 (or 210) for optimal user interface. The downward tilting control top 101 intuitively leads the user to hold the radio such that audio centric side 110 (or 210) faces towards the user (i.e. the front).

The modular aspect of the audio centric side 110 (210) and data centric side 120 (220) increases the ability to customize the radio and provide additional or interchangeable features to the end user. The radio assembly, formed in accordance with the invention is well suited to automated manufacturing environments while providing an easy to assemble modular aspect for changing out features or adding functionality to the radio.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A multi-sided radio, comprising:
an audio centric side including a speaker independent of a remaining portion of the multi-sided radio;
a modularly variable side opposing the audio centric side, the modularly variable side accommodating interchangeable physical user interface features, the interchangeable physical user interface features of the modularly variable side comprising a keypad and display interchangeable with a housing having a belt clip attachment feature; and
a top controller side slanted downwards from the modularly variable side to the audio centric side thereby leading a user to hold the multi-sided radio with the audio centric side facing towards the user, having at least one control function, wherein the at least one control function controls functions on at least one among the audio centric side and the modularly variable side when the modularly variable side includes at least one electronic function.

2. The multi-sided radio of claim 1, wherein the audio centric side comprises an option module for placement as a speaker grill insert enabling additional functions among camera functions, environmental sensors, WLAN transceivers, Bluetooth modules, audio upgrades, bar code readers, and infrared decoders.

3. The multi-sided radio of claim 1, wherein the speaker resides behind the display of the modularly variable side and has full porting out of the audio centric side.

4. The multi-sided radio of claim 1, wherein the speaker resides behind the display and has full porting in an opposite direction away from the display.

5. The multi-sided radio of claim 1, wherein a housing design for the multi-sided radio includes an ergonomical flare out feature that is substantially symmetrical on first and second sides of the radio.

6. The multi-sided radio of claim 1, wherein a battery pack housing serves as an external portion of a housing used for the audio centric side.

7. A multi-sided radio, comprising:
an audio centric side including a speaker operationally independent of functions offered on an opposing side of the audio centric side of the multi-sided radio;
a data centric side on the opposing side of the audio centric side, the data centric side being interchangeable with physical user interface features comprising a keypad and a display; a speaker residing behind the display of the data centric side, the speaker having full porting out of the audio centric side; the keypad and display being interchangeable with a belt clip feature; and a top controller side slanted downwards from the modularly variable side to the audio centric side thereby leading a user to hold the multi-sided radio with the audio centric side facing towards the user, having at least one control function, wherein the at least one control function controls functions on at least one among the audio centric side and the data centric side.

8. The multi-sided radio of claim 7, wherein the audio centric side comprises an option module for placement as a speaker grill insert enabling additional functions among camera functions, environmental sensors, WLAN transceivers, Bluetooth modules, audio upgrades, bar code readers, and infrared decoders.

9. The multi-sided radio of claim 7, wherein the top controller side is slanted downwards from the data centric side towards the audio centric side, and further comprises a top side display that is slanted towards the audio centric side.

10. The multi-sided radio of claim 7, wherein a housing design used for the data centric side and the audio centric side is substantially symmetrical.

11. The multi-sided radio of claim 7, wherein the data centric further comprises a speaker that operates independent of the speaker on the audio centric side.

12. A two-sided radio architecture, comprising:
an audio centric side including a speaker;
a top controller side slanted downwards from a modularly variable data centric side to the audio centric side thereby leading a user to hold the multi-sided radio with the audio centric side facing towards the user; the top controller side having control functions for controlling both the audio centric side and the modularly variable data centric side when the modularly variable side includes at least one electronic function;
said modularly variable data centric side opposing the audio centric side, the modularly variable data centric side being interchangeable with physical user interface features;
wherein the audio centric side presents a loudspeaker dominant user interface when the radio is held by the user; and wherein the physical user interface features of the modularly variable data centric side comprise a keypad and display interchangeable with a housing having a belt clip attachment feature.

13. The two-sided radio architecture of claim 12, wherein the speaker of the audio centric side is operationally or mechanically independent of modularly variable centric side.

14. The two-sided radio architecture of claim 12, wherein the top controller side tilts downward from the modularly variable data centric side to the audio centric side thereby providing the loudspeaker dominant interface when the radio is held by the user.

15. The two-sided radio architecture of claim 14, further comprising first and second flared portions extending from the top controller side for providing hand grips to a user.

16. The two-sided radio architecture of claim 12, further comprising:
a display on the modularly variable data centric side; and
wherein the speaker resides behind the display, the speaker having full porting out of the audio centric side.

17. The two-sided radio architecture of claim 16, further comprising an additional speaker coupled to the modularly variable data centric side.

18. A multi-sided handheld radio, comprising:
an audio centric side including a speaker independent of a remaining portion of the multi-sided radio;
a modularly variable side opposing the audio centric side, the modularly variable side providing interchangeable physical user interface features, the speaker being located on the audio centric side behind the interchangeable physical user interface features of the modularly variable side, wherein the interchangeable physical user interface features comprise one of a keypad and display being interchangeable with a belt clip attachment feature; and
a top controller side having at least one control function, wherein the at least one control function controls functions on at least one among the audio centric side and the modularly variable side when the modularly variable side includes at least one electronic function, the audio centric side and modularly variable side forming an architecture of external surfaces providing full audio porting of the speaker through the audio centric side with maximum surface area for the interchangeable physical user interface features on the modularly variable side; wherein the top controller side is slanted downwards from the modularly variable side to the audio centric side thereby leading a user to hold the multi-sided handheld radio with the audio centric side facing towards a user.

19. A multi-sided handheld radio, comprising:
an audio centric side including a speaker operationally independent of functions offered on an opposing side of the audio centric side of the multi-sided radio, the speaker being positioned in a front, central, and dominant location of the audio centric side for optimal user interface;
a data centric side on the opposing side of the audio centric side; and
a top controller side having at least one control function, wherein the at least one control function controls functions on at least one among the audio centric side and the data centric side, the top controller side being slanted downward from the data centric side to the audio centric side; and
the audio centric side and data centric side formg an architecture of external surfaces having removable and replaceable physical features to customize the multi-sided radio for an end user, wherein the removable and replaceable physical features include interchangeable display, keypad and belt clip features.

20. A two-sided handheld radio architecture, comprising:
an audio centric side including a speaker;
a modularly variable data centric side opposing the audio centric side, the modularly variable data centric side providing interchangeable physical user interface features;
a downward tilting control top located between the modularly variable data centric side and the audio centric side and, the downward tilting control top leading the user to hold the handheld radio such that audio centric side faces towards the user; and the audio centric side presenting a loudspeaker dominant user interface when the radio is held by a user, the audio centric side and modularly variable data centric side forming an architecture of external surfaces providing full audio porting of the speaker through the audio centric side with maximum surface area for the interchangeable physical user interface features on the modularly variable side, the interchangeable physical user interface features including interchangeable, display, keypad and belt clip features.

21. The two-sided handheld radio architecture of claim 20, wherein the speaker of the audio centric side is operationally or mechanically independent of modularly variable data centric side.

* * * * *

UNITED STATES PATENT AND TRADEMARK OFFICE
CERTIFICATE OF CORRECTION

PATENT NO. : 8,078,217 B2
APPLICATION NO. : 11/694810
DATED : December 13, 2011
INVENTOR(S) : Garcia et al.

Page 1 of 1

It is certified that error appears in the above-identified patent and that said Letters Patent is hereby corrected as shown below:

On the Title Page 2, in item (56), under "FOREIGN PATENT DOCUMENTS", in Column 2, Line 1, delete "EP WO2004008724 A1 1/2004".

In Column 8, Line 50, in Claim 19, delete "formg" and insert -- forming --, therefor.

Signed and Sealed this
Twenty-fifth Day of December, 2012

David J. Kappos
*Director of the United States Patent and Trademark Office*